US005597505A

United States Patent [19]

[11] Patent Number: 5,597,505

[45] Date of Patent: Jan. 28, 1997

Koenig et al.

[54] HOLE FORM APPARATUS

[76] Inventors: Donald H. Koenig, 4563 Robbins St., San Diego, Calif. 92122; Myron N. Koenig, 47587 Hwy. 55, Brooten, Minn. 56316

[21] Appl. No.: 371,404

[22] Filed: Jan. 11, 1995

[51] Int. Cl.[6] .............................. B28B 7/28; B29C 33/76

[52] U.S. Cl. ........................... 249/63; 249/177; 264/304; 425/436 R; 425/468; 425/DIG. 10

[58] Field of Search .................................. 249/1, 10, 63, 249/64, 177; 425/414, 468, 436 R, DIG. 10; 264/31, 304

[56] References Cited

U.S. PATENT DOCUMENTS

| | | | |
|---|---|---|---|
| 683,389 | 9/1901 | Davisson | 249/63 |
| 1,556,869 | 10/1925 | Murray | 249/63 |
| 2,616,137 | 11/1952 | Brownstein | 249/63 |
| 3,940,102 | 2/1976 | Bedell, Jr. | 249/63 |
| 4,998,705 | 3/1991 | Cass | 249/63 |

*Primary Examiner*—Jay H. Woo
*Assistant Examiner*—Joseph Leyson
*Attorney, Agent, or Firm*—Roth & Goldman

[57] ABSTRACT

A hole form apparatus for use in forming and/or maintaining a hole or cavity in environments which would otherwise tend to close the hole, functions for example in maintaining holes cut in ice, or for making holes or cavities in other solidifying liquids or mixtures, such as concrete, or in compactable materials such as soil. The form has a tubular body that is hollow and tapered so that it is narrower at the bottom, which is closed, than at the top. Disposed within the body is a weight connected to a shaft which extends axially through the top surface of the tube to a handle attached at its end. The form is removable from a formed hole by pulling forcefully on the handle, causing the weight to strike the inside top surface of the tube in one embodiment, or a removable strike plate in a second embodiment. This impact and the shock it causes, working together with the tapered shape of the tube and its smooth surface enable the tube to be broken free from the walls of the formed hole. For ice holes, the increase in buoyancy created when the weight is lifted further enables the form to break free of the ice. The form can be made in a variety of sizes and cross-sectional shapes.

20 Claims, 6 Drawing Sheets

HOLE FORM APPARATUS

BACKGROUND OF THE INVENTION

This invention relates in general to apparatuses for forming and/or maintaining a hole or cavity in a medium which would otherwise close the hole or cavity, for example: apparatuses for maintaining fishing holes cut through ice covering a body of water, and apparatuses for forming holes in concrete and other solidifying liquids or mixtures, and in compactible materials such as soil fill.

As used herein the terms "hole" and "cavity" refer to voids of any cross-section, and not necessarily of circular cross-section, and the term "hole" encompasses cavities.

While this invention can be used for a wide variety of applications to form and maintain a hole, it is particularly useful in maintaining ice fishing holes which are holes made through ice covering bodies of water for the purpose of fishing. Holes are made through the ice in many ways but the most common is by means of an auger. A typical hole is a seven inch round hole through relatively thick ice, thick enough to support fishermen and fishing shelters. Many fishermen move ice houses onto the ice for shelter from which they fish through a hole in the ice cut through a cut-out in the floor of the ice house. Making holes through such thick ice is hard work and takes a lot of time from the otherwise more enjoyable task of catching fish. The problem with holes cut in ice is that they tend to freeze over again when left inactive for some period of time, and a fisherman returning after the period of time must re-open the hole before he or she can resume fishing. Holes can be reopened by the use of power augers, power chisels and chain saws but these are all specialized and expensive equipment.

There have been ways devised to keep ice holes from freezing over. One way is to put a pail or bucket in the hole. However, this requires weights to be added to overcome the buoyancy in order to keep the pail or bucket in the hole. A larger diameter hole is also required and the ice may freeze much thicker than the pail or bucket which means that work is still necessary to make the hole go through the ice. Also, a pail or bucket is extremely difficult to remove from the ice. There are also some elaborate methods using inflatable bladders which when maintained under pressure will seal the hole. These devices require a source of pressure and if left for long periods may leak or otherwise lose their pressure which will allow the hole to freeze over the deflated bladder making it impossible to remove without cutting it out.

Because of the popularity of ice fishing and the effort that must be exerted to make a hole through the ice there is a great need for a simple device for keeping ice holes from freezing over.

There is also a need for making holes and cavities in solidifying liquids and mixtures, such as concrete, or even when compacting dirt and such. Conventionally molds and forms are used, but these are generally fabricated at the site which takes up valuable time. An apparatus for creating standard sized holes in concrete, for example, and which could be reusable, or permanently left in for possible later removal, would be of great advantage to a builder or contractor. This ability to form holes or cavities of a desired size and depth in concrete, sand, soil, rubble or other construction materials would be advantageous. For example, the installation of street signs and posts can be simplified by making use of a standard sized cavity into which a complementary shaped post could fit, thus eliminating further labor and effort to secure it. Since a variety of different shapes and sizes of this invention are available, its use is limited only by imagination.

Other advantages and attributes of this invention will be readily discernable upon a reading of the text hereinafter.

SUMMARY OF THE INVENTION

An object of this invention is to provide a novel hole form apparatus to plug an ice hole to keep it from freezing over.

An additional object of this invention is to provide an apparatus for making holes in a solidifying liquid or mixture.

An additional object of this invention is to provide an apparatus for making holes in soils or fill.

An additional object of this invention is to provide an apparatus for making and/or maintaining a variety of shapes and sizes of holes in environments which would otherwise close the holes.

An additional object of this invention is to provide a hole form having a built-in apparatus for assisting in the removal of the hole form from a formed hole.

An additional object of this invention is to provide a hole form having a built-in weight for assisting in buoyancy compensation and the removal of the hole form from an ice hole.

An additional object of this invention is to provide a hole form having an impact surface for a built-in weight to strike for assisting in the removal of the hole form from a formed hole.

An additional object of this invention is to provide a hole form having a striking plate for a built-in weight to strike for assisting in the removal of the hole form from a formed hole.

These objects, and other objects expressed or implied in this document, are accomplished by an apparatus having an elongated, hollow, tubular body, preferably tapered to be narrower at the bottom than at the top. As used herein the terms "tube" refers to the generally tubular shaped body of the preferred embodiment of the hole form apparatus. Preferably the tube is constructed of linear low density polyethylene, ultraviolet resistant, high impact and cold temperature tolerant, or equivalent material which has the ability to withstand high impact without breaking or cracking and which has a surface that is smooth and non-porous enough to allow easy removal from ice or other solidifying liquids or mixtures after they have solidified. For ice holes, the tube is preferably of a length greater than the thickness of ice that normally occurs on most lakes and rivers. The tube is inserted into the ice hole and secured in place. When left for a sufficient period of time, the water will freeze around the tube. The shape of the tube which is narrower at the bottom allows it to be removed from the ice without interfering in any way with the wall of the hole from which it is being removed. Inside the tube is a weight which is free to move axially within the tube and which is connected to a shaft. This weight helps counter the buoyancy of the tube as it displaces the water or other liquid in the hole or cavity. The shaft protrudes through the top surface at the wide end of the tube where it is attached to a handle. By pulling the handle, the weight can be made to strike against the inside surface of the top of the tube or against a strike plate. In one preferred embodiment, the tube is closed at both ends with the upper surface serving as a wall against which the weight can strike. In an alternate embodiment, the wide end of the tube is open and a strike plate extending through slots defined in the side of the tube serves as the wall against which the weight strikes. The impact of the weight striking the impact surface together with the vibration it generates, the shape of the tube, and the texture of its surface cause the tube to easily break free of a formed hole. The alternate embodiment utilizing the strike plate has the feature of being able to leave the tube in place while removing the weight and strike plate, and thereby discouraging theft since the removal mechanism is not present.

In operation as an ice plug, the apparatus is inserted into a hole cut into the ice and secured by means of some anchoring device such as a cord, rope, wire or some object sufficient to hold the form in place while the water freezes around the tube. Should the ice hole be wider than the tube so that there is no force-fit of the tube in the hole, the apparatus is buoyant and will float. When anchored in place, the water will freeze around the tube. To remove the form, the anchoring device is removed and the handle is pulled so that the weight, which is connected to the handle by means of the shaft, is caused to strike against the inside surface of the top of the form or against a strike plate. This impact of the weight, in addition to transferring an axial removal force to the form, creates a shock which vibrates the form that assists in breaking surface contact and removing any vacuum created thereby. This impact causes the form to break free of the ice, leaving the ice hole clear and ready for use. The same hole forming and removal functions work as well when the hole form is used in substances other than water that solidify or harden or are packed around the form.

DESCRIPTION OF THE PREFERRED EMBODIMENT

Figure 2:
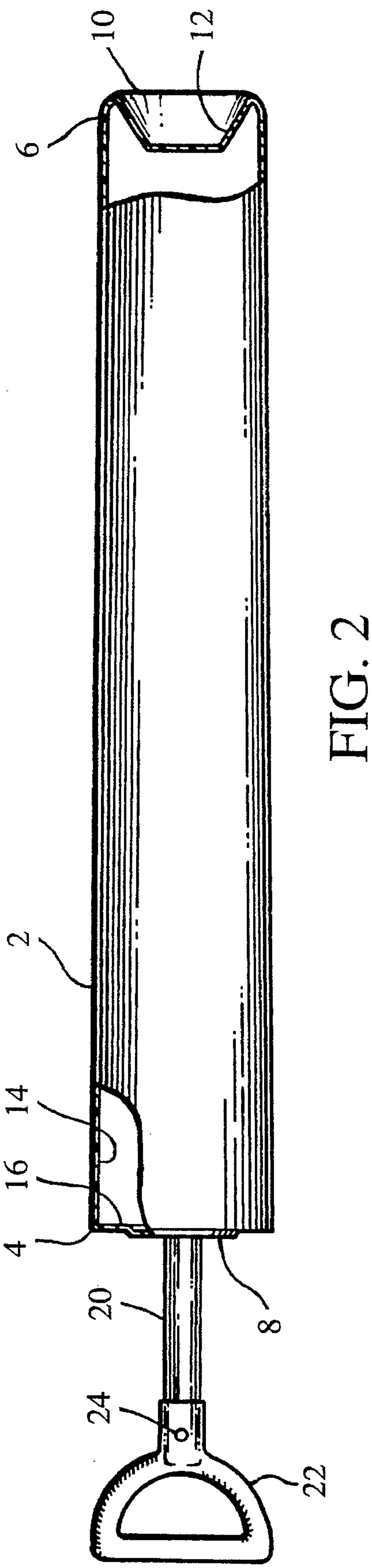
FIG. 2 is an elevational view of the preferred embodiment of the hole form.

Referring to FIG. 2, a first preferred embodiment of the hole form apparatus is illustrated to have a tubular body 2 closed at both ends. The tube is preferably constructed of a linear low density polyethylene material which is ultra violet resistant, high impact and cold temperature tolerant, or other material of similar characteristics. The tube, while shown in the drawings as having a slightly tapered cylindrical shape, need not have a circular or rounded cross-section but can be made with cross-sections of other shapes. Additionally, the length of the hole form tube can be made to fit the particular purpose and can vary from short to long in relation to its diameter. As shown in FIG. 2, while generally cylindrical in shape, the tube is tapered to be slightly larger at the top end 4 than it is at the bottom end 6.

Figure 3:
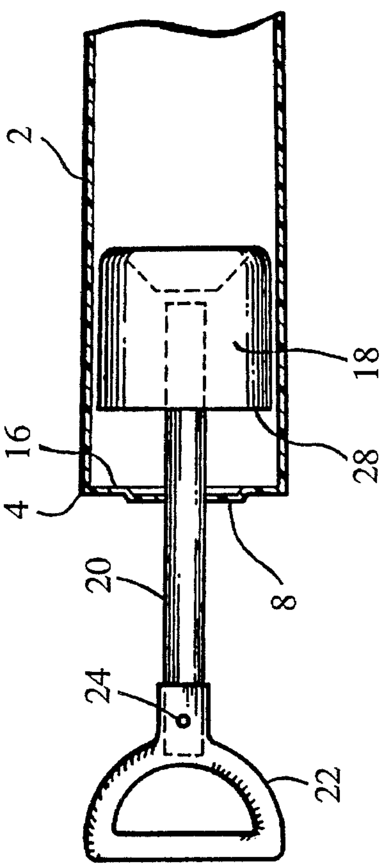
FIG. 3 is a cutaway view of the upper portion of the hole form showing the internal weight containing the shaft upon which the handle is attached.
Figure 4:
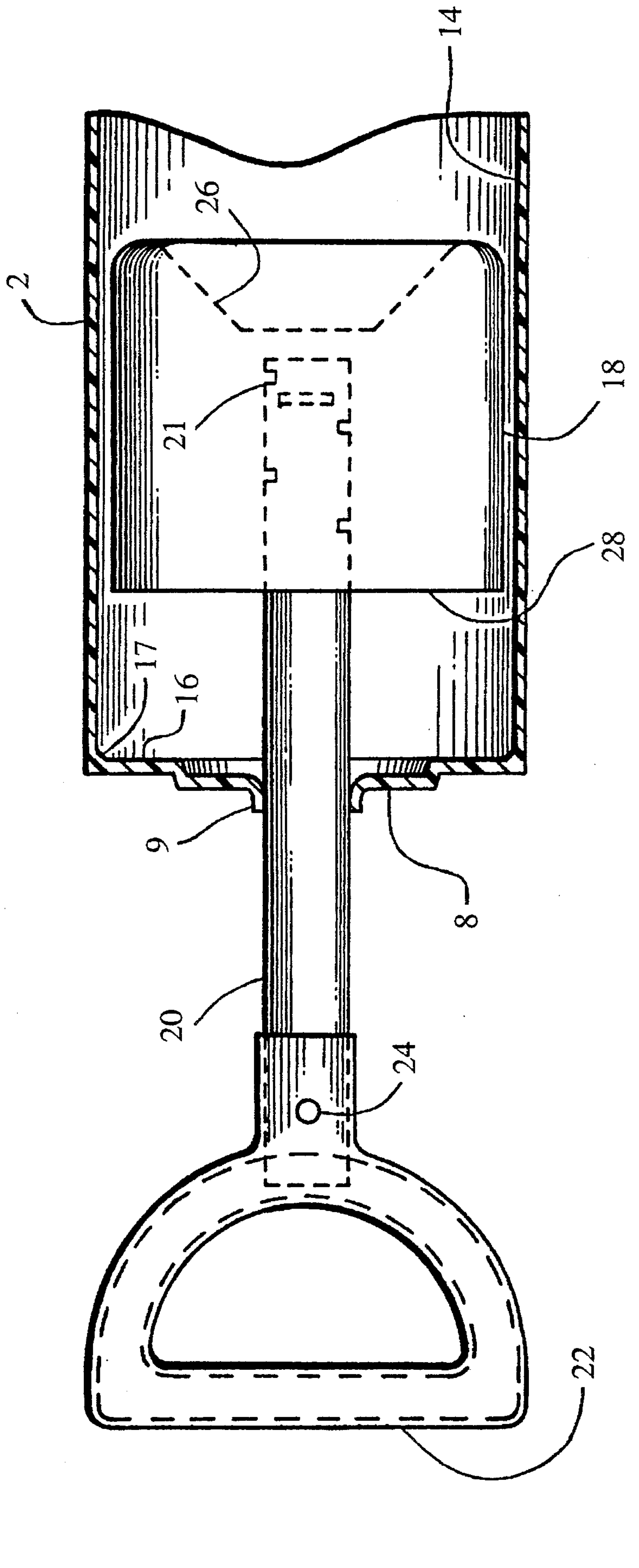
FIG. 4 is a cross-sectional view of FIG. 3.

As shown in FIGS. 3 and 4, the hole form contains an internal weight 18 into which a shaft 20 has been molded. The shaft extends through a hole defined by the top end of the tube and has a handle 22 fastened to the end of the shaft by means of a fastener such as a rivet 24.

The tube 2 is constructed of linear low density polyethylene by rotary molding which creates a stronger structure due to the radiusing of the inside corners 17 as shown in FIG. 4. The bottom of the tube at 10 has a concave indentation 12 as shown in FIG. 2. The top surface of the tube has a raised or convex surface 8 as shown in FIG. 2, 3 and 4. This leaves a stronger annular shaped striking surface 16 on the inside surface on the top of the tube proximate the circumference of the tube. The top surface 8 of the tube has a circular hole in its center surrounded by a bushing/flange 9.

The weight 18 is cast from a mixture of polyester resin and silica sand which is poured through the hole in the bushing/flange and which hardens in the bottom of the tube when it is upright. The amount of material poured for the weight depends on the application. Generally, a heavier weight is used with a longer tube to compensate for the additional surface area that must be freed. In the hole forms depicted in the drawings a weight of approximately ten pounds is used.

A shaft 20 made of a wooden dowel, or material of equivalent strength, and having a diameter less than the hole in the bushing/flange 9 of the top surface 8 and cut to approximately 1 to 2 feet, is inserted into the mixture of polyester resin and silica sand before it hardens. The length of the shaft varies according to its application and approximates the stroke length needed to move the weight with sufficient impact to break the tube free of the ice or other surrounding material. This shaft has a plurality of indentations 21 at one end to allow it to mold securely into the weight. Near the other end of the shaft there is a hole of sufficient size for a fastener to pass which is drilled through its diameter for attaching a handle 22. A tool, not shown, can act as an extension of the dowel and can be removably fastened at the end of the shaft with the hole in it. The shaft with the extension tool attached is inserted through the hole in the bushing/flange 9 in the upper surface 8 and into the mixture of polyester resin and silica sand that will harden into the weight 18. After the weight 18 is allowed to harden, it can be broken free from the tube by tapping the base of the tube around its circumference at the small end 6. The shaft 20, with weight attached, can then be pulled axially upward through the hole in the bushing/flange 9 by use of the extension tool so that the weight is pulled near the top surface. The extension tool can then be removed and the handle 22 can be fastened to the shaft 20 by means of a fastener 24, such as a double sided rivet, bolt or other suitable fastener. The handle is constructed of metal or high strength plastic material.

With the tube 2 in an upright position, the weight 18 will pull the shaft 20 down until the handle 22 abuts the bushing/ flange 9. This leaves a stroke length from the top surface 28 of the weight to the annular inside upper surface 16 of the tube, as shown in FIG. 4.

Figure 1:
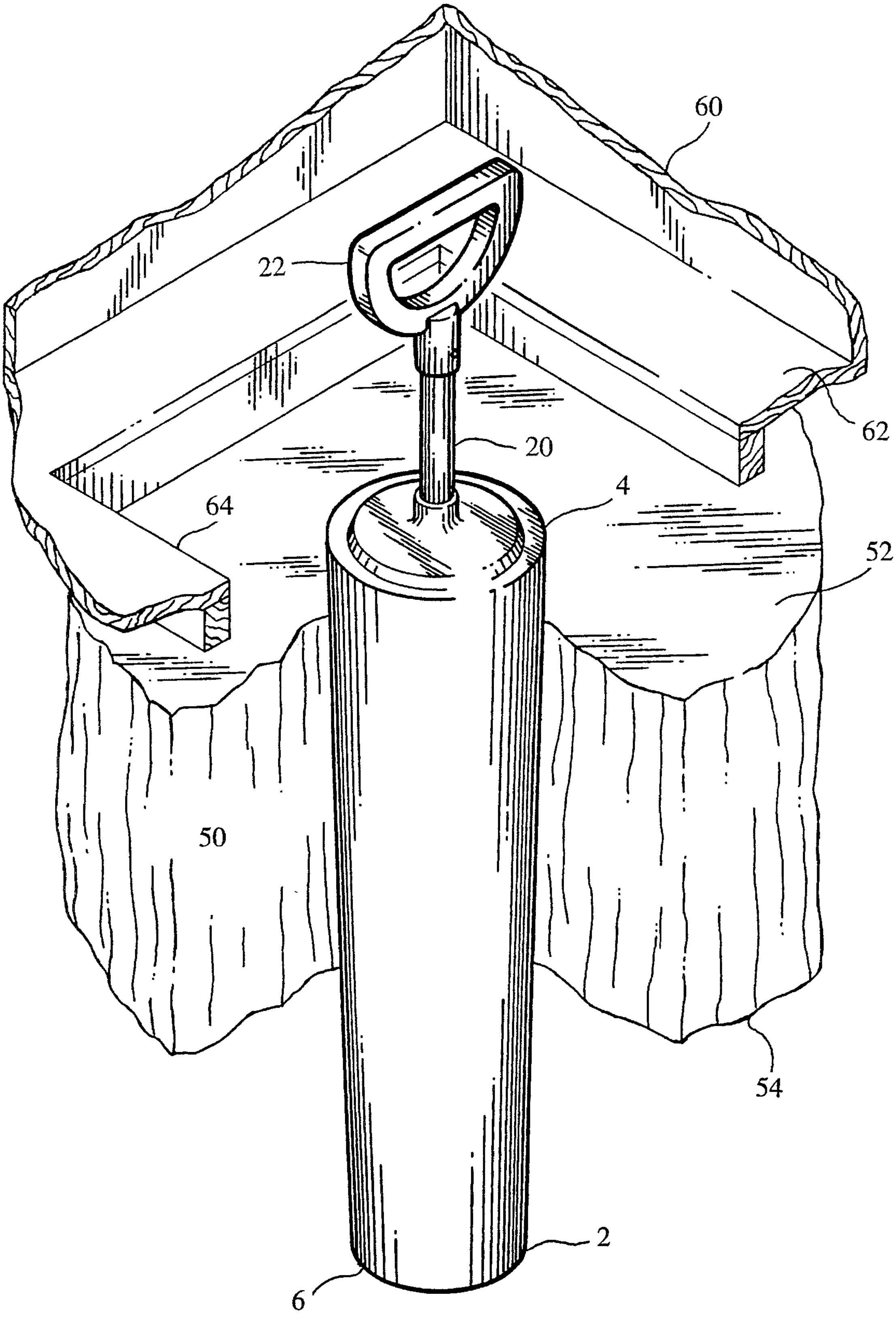
FIG. 1 is a cutaway isometric view showing the preferred embodiment of the hole form being used to plug a hole in ice through an opening of the floor of an ice house.

Referring to FIG. 1, a hole form apparatus according to this invention is shown disposed in a hole defined by a layer of ice 50. The form is shown as it may be used to maintain the hole in the ice which had previously been cut via the opening 64 in the floor 62 of an ice house 60. For general use as an ice hole plug, the length of the tube 2 must be sufficiently long enough to extend both above and below the thickest ice that would normally be expected. As seen in FIG. 1, the tube's dimension at the top, being slightly larger than the bottom is for ease of removal from the ice. Even with the weight 18, shown in FIG. 3, the hole form is buoyant enough to prevent it from sinking when used in a hole larger than its top width. In operation to plug an ice hole the apparatus is inserted at the narrow end 6 down into a pre-drilled ice hole until the sides of the tube 2 wedge against the circumference of the ice hole. The weight 18 tends to counter the buoyancy of the hole form when it is inserted into water. However, the hole form will still have sufficient buoyancy to prevent it from sinking should the ice hole be a larger size. The hole form can be secured further as indicated in FIG. 12 by tying it to supports.

Figure 12:
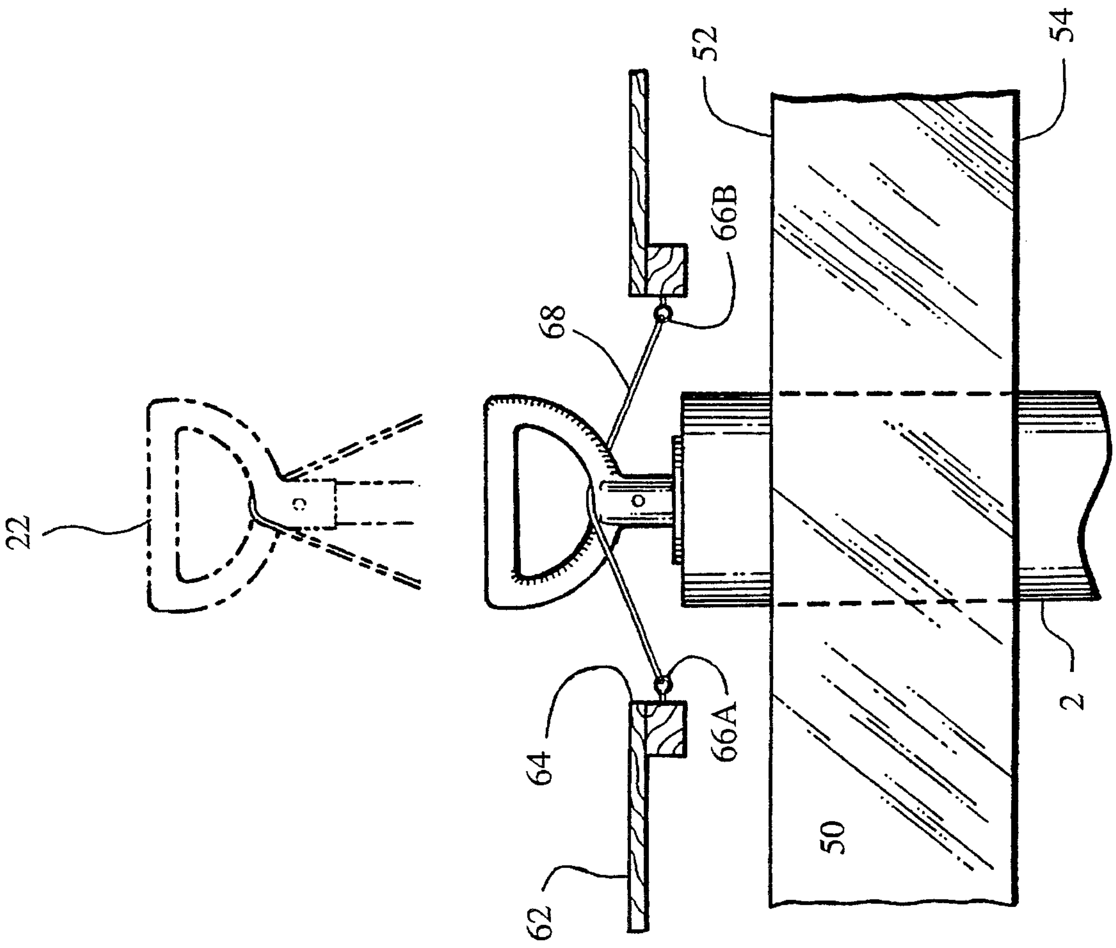
FIG. 12 is a cross-sectional view illustrating the operation of the hole form and depicting it disposed in a hole in the ice as secured in a cut out in the floor of an ice house sitting above the hole in the ice.

As shown in FIG. 12, the hole form is secured to the edge of the cut out hole 64 of an ice house. A resilient cord 68 is used to hold the hole form down by passing it through the opening in the handle 22 and tieing it to eyelets 66A and 66B which are secured in the sides of the cut out hole of the ice house. As indicated in FIG. 12, after several uses of the hole form, the hole tends to successively get slightly smaller, causing the hole form to seat in the hole lower and lower down the tube. This has the effect of causing the hole form's handle 22 to be higher and higher in relation to the surface of the ice 52 with each successive use.

To remove the hole form from the ice 50, all that needs to be done is to remove one end of the cord 68 and then pull the handle 22 axially causing the top surface of the weight 28 to impact against the annular inside surface 16. The force caused by the weight impacting against the annular inside surface transfers to the body of the tube 2, thereby causing it to break free from the ice 50 and to leave a hole free through the ice. The impact of the weight against the inside surface also causes a shock that vibrates the tube, assisting in breaking surface contact and vacuum. Additionally, the tapered sides of the tube, being narrower at the bottom of the tube than at top, aid the removal of the hole form as does the buoyancy of the tube when the weight is lifted when the handle is pulled up. Other non-elastic means can also be used to secure the hole form in the ice hole.

In addition to its use for maintaining a hole in a thickness of ice, the same principles could be applied for its use to make and maintain holes or cavities in other solidifying liquids or mixtures, such as concrete.

Figure 5:
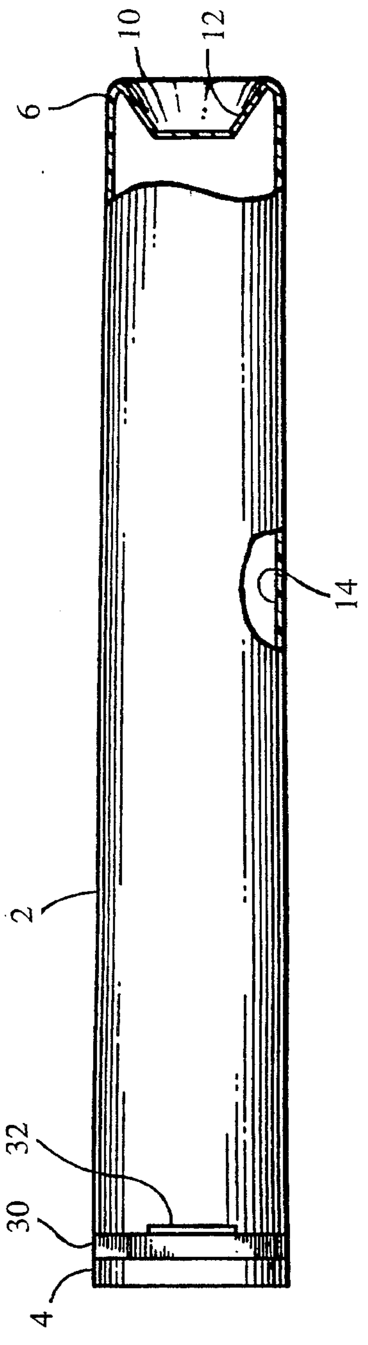
FIG. 5 is an elevational view of an alternate embodiment of the hole form tube.
Figure 8:
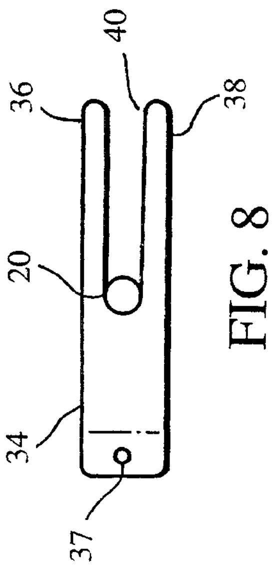
FIG. 8 is a top view of the strike plate.
Figure 9:
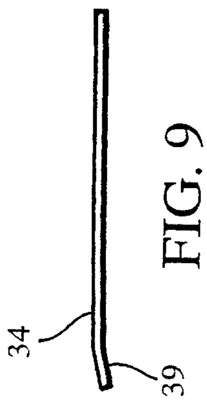
FIG. 9 is a side elevational view of the strike plate.
Figure 6:
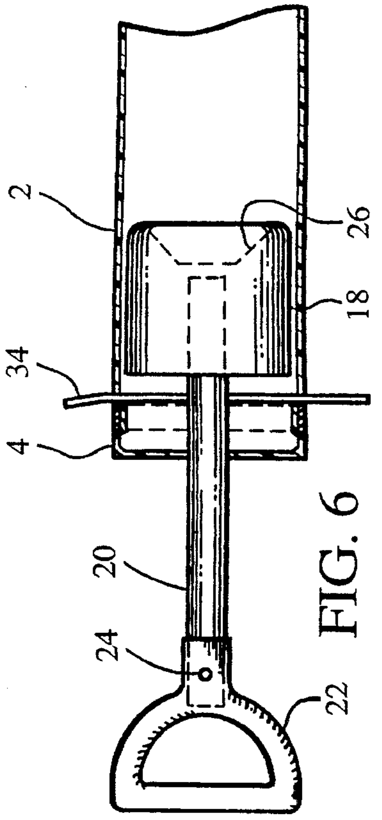
FIG. 6 is an elevational view of the upper portion of an alternate embodiment of the hole form showing the weight and striking plate installed. This view is 90° from the view of FIG. 5.
Figure 7:
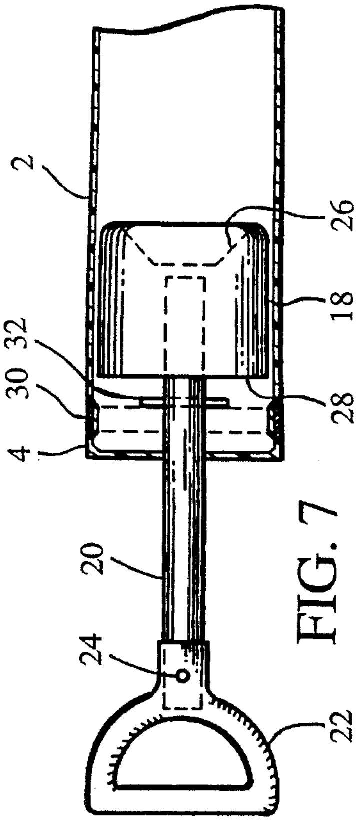
FIG. 7 shows the upper portion of an alternate embodiment of a hole form shown 90° from FIG. 6.

An alternate embodiment of the hole form is depicted by FIGS. 5–10. FIG. 5 shows the alternate embodiment of the tube 2 which is closed at the narrow end 6 and having a similar concave surface 12 as in the preferred embodiment. The wider, upper end 4 is open at the top. Approximately one inch below the upper end of the tube is a recessed section approximately one inch wide which extends around the circumference of the tube and in which a strengthening band 30 is insert molded into the wall of the tube. The band is constructed of 304 stainless steel or equivalent material and is approximately one inch wide and butt welded to form a complete band around the circumference of the tube. The thickness of the band depends on the size of the tube and the impact that must be transferred for the application. The band might also be of a varying diameter, giving it a sinusoidal or corrugated configuration, not shown, and could be molded into the side of the tube, creating a partially interwoven encasement of the band with the wall of the tube. Just below the strengthening band 30, the tube has a slot cut through the walls of the tube on two opposing sides 32. These slots are wide enough to allow the passing of the strike plate 34 through the diameter of the tube as shown in FIG. 6. The strike plate is constructed of aluminum or other metal or material which can take the impact from the weight 18 and transfer it to the strengthening band during operation of the removal of the hole form. The strike plate is long enough to extend beyond both sides of the tube. The strike plate is bifurcated as shown in FIG. 8 to contain a cutout section wide enough and extending into the strike plate far enough to enable the bifurcations to straddle the shaft 20 and allow the shaft to move freely. As seen in FIG. 9, the strike plate has an end 39 bent at an angle from the body of the strike plate. This bent portion serves as a handle and also makes the strike plate easy to pick up on a flat surface. A hole 37 in the bent portion can be used for tying a cord to the strike plate.

Figure 10:
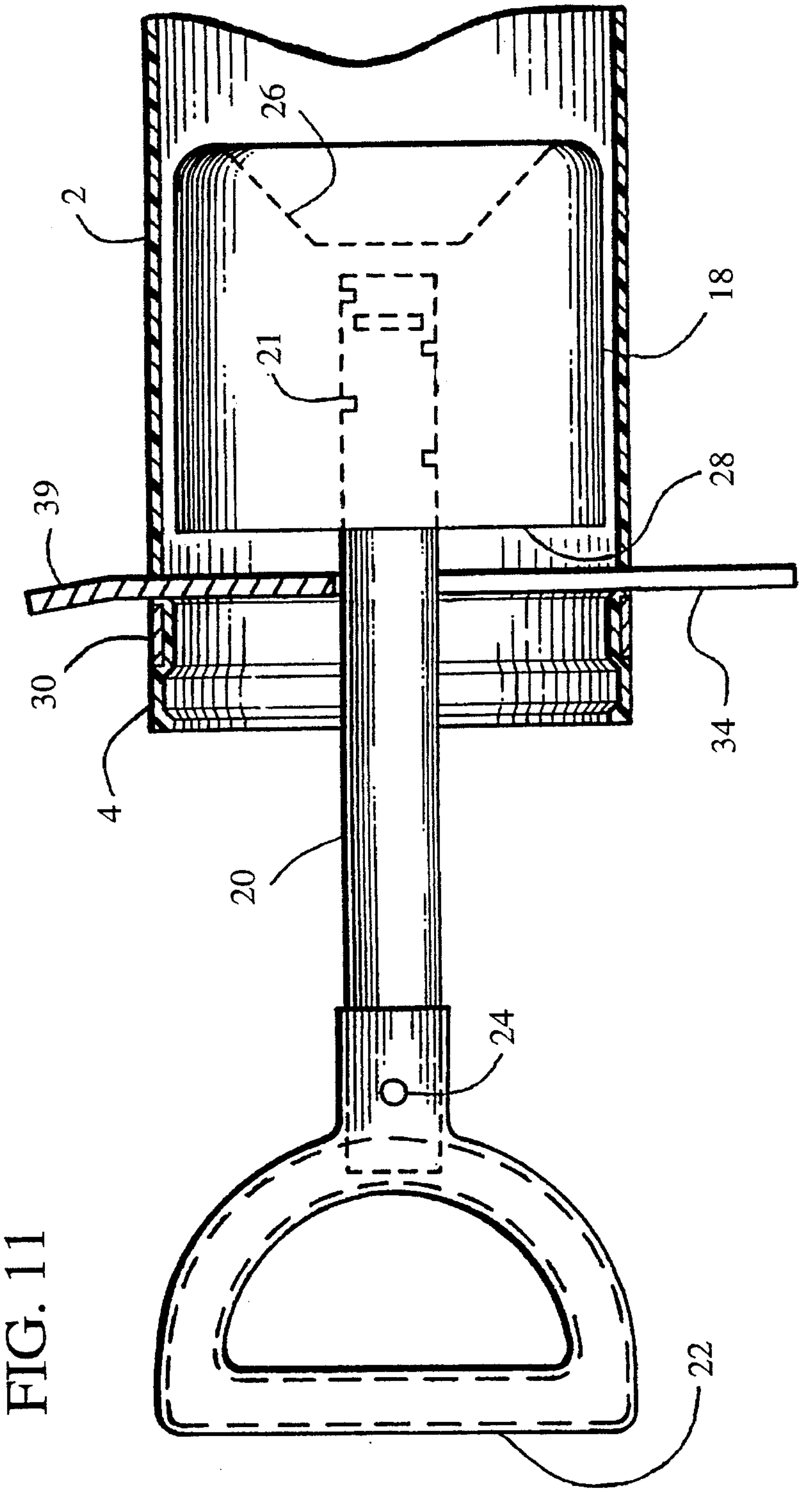
FIG. 10 is a cross-sectional view of the upper portion of the alternate embodiment of the hole form showing the weight, strike plate and stainless steel band installed.
Figure 11:
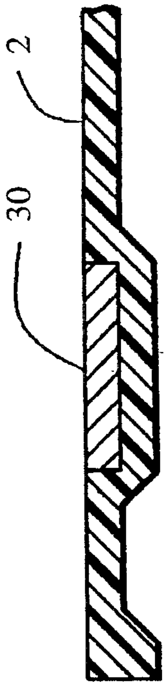
FIG. 11 is a cross-sectional view of the wall of the hole form tube at the wide end showing the band installed in the recess in the surface of the tube.

As can be seen in FIG. 10, the operation of the alternate embodiment of the hole form is similar to that of the preferred embodiment except that the striking surface 28 of the weight 18 impacts against the strike plate 34 when the handle 22 is pulled axially upward. The force of the impact of the weight striking the strike plate is transferred from the strike plate to the strengthening band 30 since the bottom edge of the band overlaps the top of the slotted hole 32 in which the strike plate is positioned. The force and shock caused by the impact of the weight is transferred to the tube 2 by means of the strengthening band, thereby causing the tube to break free of the ice or other material which has formed around it. FIG. 11 shows the band 30 disposed in the recession in the surface of the tube thereby allowing the force of the impact of the weight to be transferred to the wall of the tube.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

We claim:

1. A form for defining a hole comprising:

(a) a hollow, tubular body having a long axis, a first end along the axis, and a second end along the axis opposite said first end, said second end being closed so as to be watertight, (b) an impact surface normal to the long axis within and connected to the body, (c) impact means, disposed within the body, for impacting the impact surface of the body when said impact means is forcefully pulled, and (d) means for forcefully pulling the impact means.

2. The form of claim 1 wherein the impact means comprises a weight slidably disposed within said body.

3. The form of claim 2 wherein the impact surface is a closed first end of the body defined by the first end, and wherein said means for pulling the impact means comprises:

(a) a central hole defined by the first end of the body, (b) a shaft extending through said central hole from outside the body to inside the body, an end of the shaft inside the body being connected to the weight, and (c) a handle connected to the opposite end of the shaft.

4. The form of claim 1 wherein the impact surface comprises a strike plate mounted normal to said long axis and proximate said first end of the body.

5. The form of claim 4 wherein the strike plate is removable.

6. The form of claim 1 wherein the body is tapered to enhance removal of same from a formed hole.

7. The form of claim 1 wherein the second end of the body opposite the first end is concave to further enhance removal of same from a formed hole.

8. The form of claim 2, wherein said weight is formed by pouring an initially flowable material, which will subsequently harden to form a dense solid mass, into an interior bottom portion of said body adjacent the second end which acts as a cast in forming a hardened weight, wherein said material subsequently hardens, and is subsequently loosened from the body, forming a free-moving weight slidably disposed within said body.

9. The form of claim 8 wherein the means for forcefully pulling the impact means comprises a shaft inserted into said material prior to hardening so that said material hardens around said shaft.

10. A form for defining a cavity in a solidifying material comprising:

(a) a hollow body having a long axis, a proximal end along said axis, and a distal end opposite said first end along said axis, said distal end being closed so as to be watertight, said hollow body having a consistent shape in sections taken normal to said axis along said axis, and a concave configuration at said distal end;

(b) an impact surface disposed normal to the long axis and in force transferring contact with said body;

(c) a weight, slidably disposed within said hollow body distal of said impact surface;

(d) an actuator adapted to pull said weight in a proximal direction toward said impact surface so as to strike said impact surface.

11. The form of claim 10 wherein said weight is formed by pouring an initially flowable material into said body, which material subsequently hardens into a solid mass, said material settling at the distal end of the interior of said body and thereby being cast into a solid shape defined thereby, and wherein said actuator is inserted into said material before hardening so that said weight hardens around a portion of said actuator to provide a connection therewith.

12. The form of claim 11 wherein said closed end of said body is formed unitary with said body.

13. The form of claim 12 wherein said body is formed; of a polymeric material.

14. The form of claim 13 wherein said impact surface further comprises a separate removable strike plate.

15. The form of claim 13 wherein said actuator is a shaft having a distal end adapted to bond with said weight and a proximal end having a handle adapted for grasping said actuator.

16. The form of claim 13 wherein said impact surface comprises an annularly inwardly extending flange portion of said body formed unitary therewith and at least partially closing said first end of said body.

17. A form for defining a hole comprising:

(a) a hollow, tubular body having a long axis, a first end and a second end along the axis;

(b) an impact surface normal to the long axis comprising a strike plate mounted proximate the first end of the body by being inserted into slots defined by the body;

(c) impact means, disposed within the body, for impacting the impact surface of the body when said impact means is forcefully pulled; and (d) means for forcefully pulling the impact means.

18. The form of claim 17, further comprising reinforcing means for enhancing transfer of an impact from the strike plate to the body comprising an annular band disposed in a recessed portion of the outer surface of the body and abutting the strike plate.

19. The form of claim 18, wherein the reinforcing means comprises a varying diameter annular band molded into the wall of the body proximate the first .end of said body and abutting the strike plate.

20. The form of claim 17 wherein said strike plate is mounted by being inserted into opposing slots defined by the body and comprises a metal plate having a length sufficient to span across the first end of said body, and said means for forcefully pulling the impact means comprises a shaft connected to said impact means, the metal plate further comprising:

(a) a bifurcated portion having two arms long enough and separated from each other sufficiently to allow said arms to straddle the shaft when the metal plate is disposed within the slots defined in the sides of the body, (b) handle means, at a non-bifurcated end of said metal plate, for gripping to insert and remove the metal plate, and (c) means for attaching a tether to said metal plate.

* * * * *